(No Model.)
R. F. SPANGENBERG.
APPARATUS FOR LUBRICATING GIN SAWS.
No. 416,079. Patented Nov. 26, 1889.
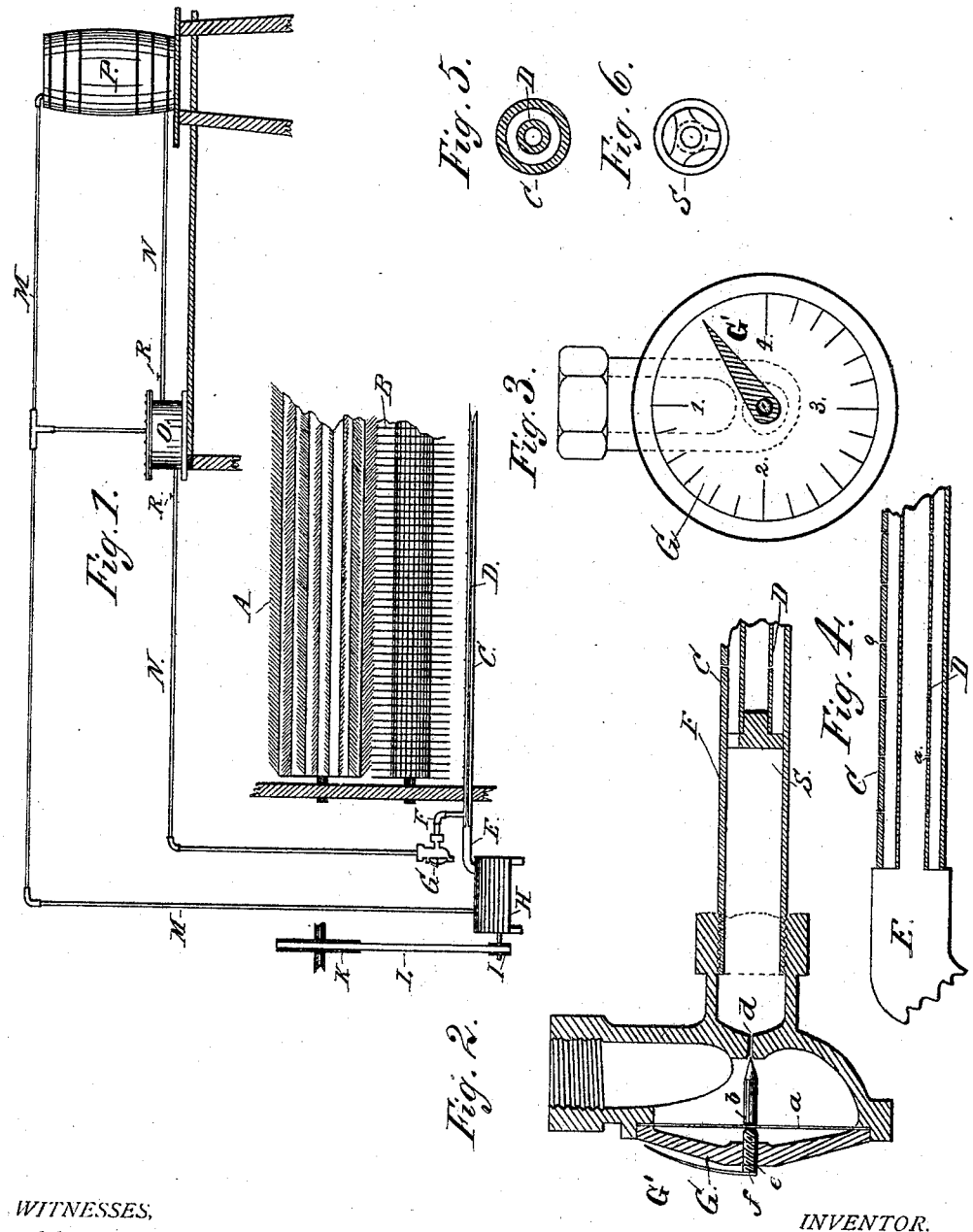
WITNESSES,
INVENTOR.
Robert F. Spangenberg
by W. R. Stringfellow
ATTORNEY.

UNITED STATES PATENT OFFICE.

ROBERT F. SPANGENBERG, OF NEW ORLEANS, LOUISIANA.

APPARATUS FOR LUBRICATING GIN-SAWS.

SPECIFICATION forming part of Letters Patent No. 416,079, dated November 26, 1889.

Application filed May 21, 1889. Serial No. 311,568. (No model.)

*To all whom it may concern:*

Be it known that I, ROBERT FERRIDAY SPANGENBERG, a citizen of the United States, residing at New Orleans, in the parish of Orleans and State of Louisiana, have invented certain new and useful Improvements in a Method of Ginning Cotton by Lubricating the Saws with Mineral Oil; and I do declare the following to be a full, clear, and exact description of the invention, such as will enable others skilled in the art to which it appertains to make and use the same.

My invention relates to an improvement in apparatus for lubricating gin-saws with mineral oil, in which two perforated pipes placed in close proximity to the saws of a gin are made to operate in conjunction by the introduction of oil and a current of air; and the objects of my improvements are to provide a method for lubricating the sides of the saws of a cotton-gin, and thereby prevent all gumming of saws. I attain these objects by the mechanism illustrated in the accompanying drawings, in which—

Figure 1 is a side view. Fig. 2 is a sectional side view of gage and pipe. Fig. 3 is a front view of oil-gage. Fig. 4 is a side sectional view of oil and air pipe leading from blower. Fig. 5 is a sectional view of oil and air pipe. Fig. 6 is a sectional view of oil and air pipe inlet.

Similar letters refer to similar parts throughout the several views.

In carrying my method into operation I take a gin-brush, as shown by A, and place it in the usual position to the gin-saws B.

In close proximity to the gin-saws I place the perforated pipe C, through which I introduce oil.

Within the pipe C, I place a perforated pipe D, which I designate my "air-pipe," E being an elbow or connection to blower H.

I and K are pulleys upon which belt L is placed.

M is an equalizing-pipe, which leads from blower and is carried into oil-tank P and trap O.

R R are cocks placed upon oil-pipe N.

G is a gage, which regulates the flow of oil, allowing a given quantity to enter pipe C through elbow or opening F in a specified time. Arranged within this gage is a flexible diaphragm carrying a plug b, which latter is tapered and adapted to close or partly close an opening d, leading to the perforated air and oil pipe. In the outer wall of this gage is a threaded aperture e, in which is seated a threaded stud f. This threaded stud carries a finger G' at its outer end, by which the said stud may be turned. The inner end of the latter is designed to press upon the diaphragm and move the plug b toward the opening d, thus regulating the supply to the perforated pipes. The outer side of the gage, as best shown in Fig. 3, and the finger G', which moves over the graduated face, are thereby made to serve the additional function of an indicator.

a and o are openings in pipes D and C.

S shows construction placed in end pipe C, and to which pipe D is adjusted.

Having thus shown the construction of my device for carrying into operation my method of lubricating the sides of the saws of a cotton-gin, I will now state how I carry same into practice. Placing in tank P an odorless mineral oil, the cocks R R are opened, so as to permit the oil to flow through pipe N and pass through trap O, and thence down until it reaches gage G, through which it passes. After the oil passes through gage and elbow F and reaches perforated pipe C it comes in contact with a current of air that is forced into perforated pipe D, thus causing the oil to be thrown upon the sides of the gin-saws in small atoms through the perforated openings o in pipe C during the ginning process, and in this manner the sides of the saws are thoroughly lubricated and all gumming or choking of saws with cotton prevented. The equalizing-pipe M, attached to blower, and which is extended within oil-trap O and oil-tank P, causes an equal pressure to be given at those points, while the oil by its own gravity is carried downward through pipe N to gage G and will flow freely within pipe C.

A striking advantage of my means is that the sides of each saw are thoroughly lubricated, friction is avoided, and it is rendered impossible to choke the gin by the accumulation of cotton upon the saws.

Having fully described my invention, what I claim, and desire to secure by Letters Patent, is—

1. The combination, with a cotton-gin, of a perforated oil-pipe and a perforated air-pipe arranged therein, substantially as specified.

2. The combination, with a cotton-gin, of an oil and air supply pipe arranged therein, and a blower connected with said pipes, substantially as specified.

3. The combination, with a cotton-gin, of an oil and an air pipe arranged therein, a blower attached to said pipes, an oil-supply-pipe, and a gage interposed between the oil-supply pipes and said perforated pipes, substantially as specified.

4. The combination, with a cotton-gin, of a perforated oil-pipe and an air-pipe arranged therein, a blower connected with said pipe, an oil-supply-pipe, a gage interposed between the supply-pipe and the perforated pipe, and a trap connecting an oil-tank with the oil-supply pipe, substantially as specified.

5. The combination, with a cotton-gin, of a perforated oil-pipe and an air-pipe arranged therein, a blower connected with said pipe, a reservoir, an oil-supply pipe, a gage interposed between the supply-pipe and the perforated pipe, a trap interposed between the reservoir and the oil-supply pipe, and an equalizing-pipe leading from the reservoir to the blower, substantially as specified.

In testimony whereof I affix my signature in presence of two witnesses.

ROBERT F. SPANGENBERG.

Witnesses:
JOHN A. ADAMS,
PERCY D. PARKS.